United States Patent
McIntyre et al.

(10) Patent No.: US 9,522,579 B1
(45) Date of Patent: Dec. 20, 2016

(54) TIRE PRESSURE MONITORING SENSOR

(71) Applicant: Continental Automotive Systems, Inc., Auburn Hills, MI (US)

(72) Inventors: Matthew D McIntyre, New Baltimore, MI (US); Jean-Christophe Deniau, Fenton, MI (US); Brian Farrell, Troy, MI (US); Yasser Gad, Macomb, MI (US); Dhivya Vijayan, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/728,459

(22) Filed: Jun. 2, 2015

(51) Int. Cl.
*B60C 23/04* (2006.01)

(52) U.S. Cl.
CPC .................. *B60C 23/0471* (2013.01)

(58) Field of Classification Search
CPC .................................. B60C 23/0471
See application file for complete search history.

(56) References Cited

U.S. PATENT DOCUMENTS

| | | | |
|---|---|---|---|
| 5,661,804 A | 8/1997 | Dykema et al. | |
| 7,173,520 B2 | 2/2007 | Desai et al. | |
| 7,243,535 B2 | 7/2007 | Shimura | |
| 7,592,904 B2 | 9/2009 | Kochie et al. | |
| 7,688,192 B2 | 3/2010 | Kenny et al. | |
| 8,368,524 B2 | 2/2013 | Oda | |
| 8,659,412 B2 | 2/2014 | Deniau | |
| 8,692,661 B2 | 4/2014 | Deniau et al. | |
| 8,912,896 B1 | 12/2014 | Yu et al. | |
| 2008/0094198 A1 | 4/2008 | Yu | |
| 2008/0197995 A1 | 8/2008 | Taki | |
| 2009/0231114 A1 | 9/2009 | Yu | |
| 2012/0050029 A1 | 3/2012 | Yu et al. | |
| 2012/0235807 A1* | 9/2012 | Rysenga | B60C 23/0472 340/445 |
| 2012/0262285 A1 | 10/2012 | Chen et al. | |

(Continued)

FOREIGN PATENT DOCUMENTS

| | | |
|---|---|---|
| CA | 2781355 A1 | 12/2013 |
| CN | 102837569 A | 12/2012 |

(Continued)

OTHER PUBLICATIONS

Search Report dated Dec. 16, 2015, from corresponding GB Patent Application No. GB1510376.5.

(Continued)

*Primary Examiner* — Leon Flores

(57) ABSTRACT

A TPM sensor is programmed. The TPM sensor is configured with a TPM identifier and makes transmissions according to a current transmission protocol or protocols. A low frequency (LF) signal is received and the LF signal was transmitted according to a predetermined transmission protocol or language. An identity of the predetermined transmission protocol or language associated with the LF signal is determined. Based upon the identity of the predetermined transmission protocol or language, at least one of the TPM identifier or the current transmission protocol or protocols are adjusted, and the TPM sensor subsequently makes transmissions according to the predetermined transmission protocol associated with the LF signal.

27 Claims, 7 Drawing Sheets

(56) References Cited

U.S. PATENT DOCUMENTS

| | | | |
|---|---|---|---|
| 2012/0262286 A1 | 10/2012 | Chen et al. | |
| 2013/0038442 A1* | 2/2013 | Deniau | B60C 23/044 340/447 |
| 2013/0061456 A1 | 3/2013 | Lefaure et al. | |
| 2013/0226403 A1 | 8/2013 | Zhang | |
| 2014/0002258 A1* | 1/2014 | Chen | B60C 23/0455 340/447 |
| 2014/0165026 A1 | 6/2014 | Farrell et al. | |
| 2014/0253311 A1 | 9/2014 | Chang et al. | |
| 2014/0306815 A1 | 10/2014 | Barrett et al. | |
| 2015/0015387 A1 | 1/2015 | Farrell et al. | |
| 2015/0042464 A1 | 2/2015 | Chang et al. | |
| 2015/0239308 A1* | 8/2015 | Yu | B60C 23/0471 340/10.52 |

FOREIGN PATENT DOCUMENTS

| | | |
|---|---|---|
| CN | 102848866 A | 1/2013 |
| CN | 102862450 A | 1/2013 |
| CN | 103192669 A | 7/2013 |
| CN | 103332076 A | 10/2013 |
| CN | 203331757 U | 12/2013 |
| CN | 103587357 A | 2/2014 |
| CN | 103921628 A | 7/2014 |
| CN | 104502017 A | 4/2015 |
| EP | 2423008 B1 | 2/2012 |
| EP | 2722201 A1 | 4/2014 |
| EP | 2810796 A1 | 12/2014 |
| EP | 2813379 A1 | 12/2014 |
| JP | 2012071755 A | 4/2012 |
| JP | 2012144083 A | 8/2012 |
| TW | 201441069 A | 11/2014 |
| TW | 201442891 A | 11/2014 |
| WO | 2013/022435 A1 | 2/2013 |
| WO | 2013/022437 A1 | 2/2013 |
| WO | 2013155952 A1 | 10/2013 |
| WO | 2015/009595 A1 | 1/2015 |

OTHER PUBLICATIONS

EPODOC translation of abstract of CN 104502017A.
International Search Report and Written Opinion dated Sep. 16, 2016 from corresponding International Patent Application No. PCT/US2016/035084.

* cited by examiner

TIRE PRESSURE MONITORING SENSOR

TECHNICAL FIELD

This application relates to tire pressure monitors, and more specifically, to the operation and programming of these devices.

BACKGROUND OF THE INVENTION

Tire pressure monitoring (TPM) sensors are used in vehicles. These sensors (disposed at the tire) measure the pressure of the tire (and potentially other parameters) and transmit this to a receiver in the vehicle. When the pressure falls below a predetermined threshold, the receiver may warn the driver.

TPM sensors typically need to be activated. This is often accomplished by a technician using an activation tool. Initiation devices in the vehicle can also be used. Low frequency (LF) commands are typically sent by these devices to the TPM sensor in order to perform the activation.

Various issues have arisen regarding the programming or activation of TPM sensors. Vehicles typically require a TPM sensor identifier (ID) with a specific configuration in order to work on that vehicle. In one specific example, the TPM sensor ID may be used to differentiate between a high-level and low-level type of vehicle or between vehicles of different vehicle manufacturers.

However, since the TPM sensors have a unique ID that is programmed into the internal electronics of the TPM sensor this prevents a multi-application TPM sensor from being used on different types of vehicles thereby requiring different types of TPM sensors.

Another limitation is that with previous multi-application TPM sensors, many different protocols are transmitted so that a sensor could be used on a wide arrange of vehicle. This presents a problem because, first, the amount of information is great and its transmission consumes much battery life, causing a shorter life of the product in the vehicle. Second, many vehicle TPM systems rely on specific timing interactions between the TPM sensor and the TPM system on the vehicle.

Another limitation is associated with locking the ID or transmission protocol to the TPM sensor. Because the locking typically occurs based upon state, there is always a chance that it will have been locked according to the wrong state and send out the wrong commands.

Some TPM sensors have the ability to be locked in a certain configuration that would transmit the appropriate tire information based on the vehicle that it is installed. These sensors may need to be reset to the default condition.

One problem with this approach is that there needs to be a procedure that could reset the sensor back to its original state that is convenient to a user but not something that could easily be done by accident. If a TPM sensor is accidentally reset to its original state, then, if not relearned properly, the TPM System may fail on the vehicle.

Locking a multi-application TPM Sensor in a particular configuration corresponding to a particular vehicle set may be necessary in some circumstances. However, there is a risk in previous approaches that the TPM sensor could be locked in the wrong configuration causing the TPM sensor to fail to work with the TPM system in the vehicle it is being used.

All of the above-mentioned problems have created some user dissatisfaction with previous approaches.

BRIEF DESCRIPTION OF THE DRAWINGS

For a more complete understanding of the disclosure, reference should be made to the following detailed description and accompanying drawings wherein.

Figure 1:
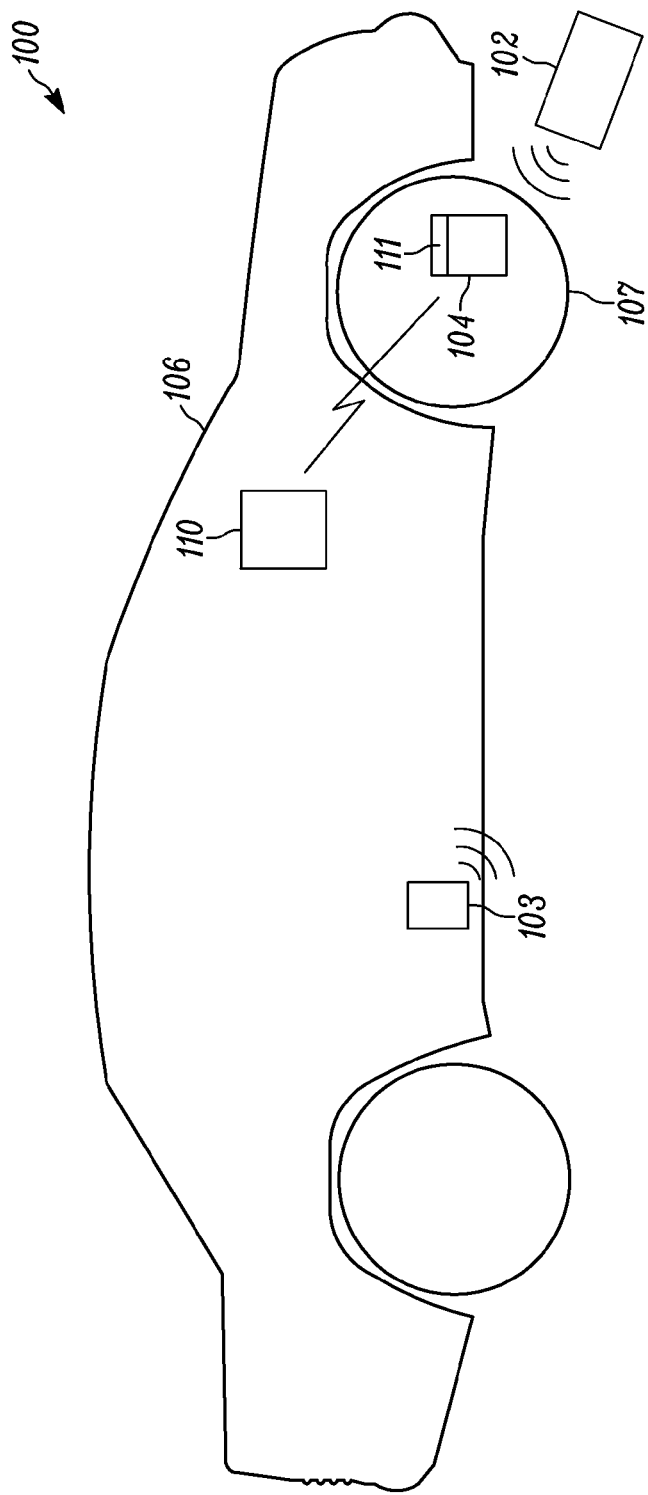
FIG. 1 comprises a block diagram of a TPM system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provide herein that configure various aspects of a TPM sensor. The approaches are easy to use, cost effective to implement, and provide sensors that are more flexible to use.

In many of these embodiments, a TPM sensor is programmed. The TPM sensor is configured with a TPM identifier and makes transmissions according to a current transmission protocol or protocols. A low frequency (LF) signal is received and the LF signal was transmitted according to a predetermined transmission protocol or language. An identity of the predetermined transmission protocol or language associated with the LF signal is determined. Based upon the identity of the predetermined transmission protocol or language, at least one of the TPM identifier or the current transmission protocol or protocols are adjusted. The TPM sensor subsequently makes transmissions according to the predetermined transmission protocol associated with the LF signal.

In some aspects, the LF signal is received from a portable programming tool or from a fixed LF initiator in a vehicle. In other aspects, the predetermined transmission protocol is subsequently locked to the TPM sensor. In other examples, the predetermined transmission protocol or language indicates a vehicle manufacturer or type of vehicle.

In some other examples, the LF signal comprises a first command from a portable programming tool that obtains the identifier. The sensor responsively transmits the identifier to the portable programming tool, and a second LF signal is transmitted from the portable programming tool to the sensor. The second LF signal is a second command that includes the identifier.

In other aspects, the pressure of a tire is measured and the transmissions are made according to the transmission protocol regardless of the measured pressure. In other examples, the identifier at a portable programming tool is stored, the identifier is transmitted from the portable programming tool to a receiver in a vehicle, and the predetermined transmission protocol is automatically locked to the sensor when a predetermined event is detected. In some examples, the predetermined event is a pressurization of the tire. In still other aspects, the locking occurs before a predetermined time limit has been reached.

In others of these embodiments, a tire pressure monitoring (TPM) sensor includes a memory, a transmitter, a receiver, and a controller. The memory stores a TPM identifier and a current transmission protocol or protocols. The receiver is configured to receive a low frequency (LF) signal, and the LF signal has been transmitted according to a predetermined transmission protocol or language. The controller is coupled to the transmitter and the receiver. The controller is configured to determine an identity of the predetermined protocol or language, and based upon the determined identity of the predetermined protocol or language, adjust at least one of the TPM identifier or the current transmission protocol or protocols. The TPM sensor subsequently makes transmissions according to the predetermined transmission protocol of the LF signal.

In some of the approaches described herein, the TPM sensor identifier ID is changed on-the-fly based upon the action (e.g., an LF command) from a TPM tool or a vehicle action (e.g., acceleration or indication of acceleration). As a result, a single TPM sensor can be used as a replacement part in multiple types of vehicles.

In some aspects, the TPM tool sends a LF command that is specific to the type of vehicle that it is installed to the TPM sensor. The TPM sensor decodes the LF command and based upon the command configures the ID to be compatible with the type of vehicle. In some aspects, the vehicle (e.g., an initiator fixed in the vehicle) may send LF commands.

In some aspects, the LF commands received by the TPM sensor may indicate that the TPM sensor is installed on a specific type of vehicle (i.e., the LF initiator from the vehicle may send a LF command that has the TPM sensor ID embedded in the command). If the condition indicates that the TPM sensor is installed on a specific type of vehicle and the TPM ID will not be changing, then the TPM ID can be locked and cannot be changed unless the sensor is reset into its original state. This approach advantageously prevents erroneous changes to the ID of the TPM sensor.

In others of these embodiments, a multi-application TPM sensor (i.e., a sensor that transmits according to a plurality of transmission protocols) is configured based on the actions of a TPM system relearn tool or the vehicle and lock the multi-application TPM sensor into a configuration that will send the required information according to a single protocol, for instance, for specific vehicle types.

In one specific example, based upon the language, format, or protocol of a received LF command, the TPM sensor is configured according to that command language (i.e., not what is in the command, but the format, baud rate, and so forth). The specific vehicle types are determined by the actions of the TPM system relearn tool or vehicle actions.

In other examples, when the TPM sensor is above a certain threshold and it receives a specific action by a TPM system relearn tool or by LF initiators on the vehicle the TPM sensor then locks into a configuration that transmits the appropriate RF data for that vehicle system.

In the event that the vehicle TPM system has an automatic TPM sensor learning system (i.e., a system where learning of sensor IDs is accomplished automatically without human intervention), where the TPM sensor is not acted upon by a TPM system relearn tool or LF initiators on the vehicle then the TPM sensor can be configured and locked based on action by the vehicle. In some aspects, the TPM sensor remains locked on the configuration, so that it is not inadvertently changed to a different configuration by a TPM system relearn tool or a vehicle action.

In other examples, a selectable reset command on the TPM system relearn tools that would only reset the targeted TPM sensor. In some examples, a configured TPM sensor is locked into a certain configuration and would be reset by a TPM system relearn tool.

In some aspects, the TPM system relearn tool sends a specific command to reset the TPM sensor back to the original state of the TPM sensor. In these regards, the TPM system relearn tool sends a command to the TPM Sensor to retrieve the ID of the TPM sensor and then transmits a reset command that includes the ID of the TPM sensor so that only the specific TPM sensor is reset.

In some examples, the TPM sensor is not be able to be reset by a measurement of a change in pressure or zero pressure. This would not be allowed because delta pressure and a zero pressure measurement (e.g., flat tire) are real-life scenarios and if the TPM sensor becomes reset, then if it is not relearned properly, then the TPM system may fail on the vehicle.

In other examples, the present approaches greatly reduce the likelihood of a multi-application TPM sensor being locked in the wrong configuration while allowing the service shop technician the flexibility of verifying that the TPM sensor is functioning properly and/or learning the TPM sensor to a vehicle with a TPM relearn tool prior to installing or pressurizing the TPM sensor. In one aspect, the TPM sensor responds to LF signals from TPM relearn tools with the appropriate RF response at any time, regardless of the pressure it detects. This approach allows the technician at the service shop the convenience of being able to verify proper functionality prior to installation. However, the TPM sensor will only store the last received LF signal and not lock to a configuration based on the LF signal until it is pressurized. Handling the locking in this way reduces the time that the TPM sensor could receive a wrong LF signal and be configured to the wrong type.

This is a very small window of time and therefore greatly reduces the chance of the TPM sensor being configured in the wrong configuration while allowing the technician to trigger the TPM sensor when it is not pressurized and taking into account the possibility of the technician not triggering the TPM sensor again after installation.

Referring now to FIG. 1, a system includes a LF programming tool 102, an LF initiator 103, a sensor 104, and a vehicle 106. The sensor is disposed into the tires 108 of the vehicle. The vehicle 106 has a receiver 110.

The LF programming tool 102 is a portable hand-held programming tool that is moved from sensor to sensor in order to program the sensors. The programming may be done in the form of LF commands. The LF initiator 103 is at a fixed location within the vehicle and also sends RF commands.

The sensor 104 measures the pressure of a tire and it may also measure other parameters. It receives commands from the tool 102 or the initiator 103. The commands configure the sensor to transmit transmissions to the receiver 110. The transmissions transmit the measured tire pressure to the receiver 110. If the measured pressure is below a predetermined threshold, the receiver 110 can alert the driver that there is a problem with the tire.

In one example, an ID 111 of the sensor may be changed dynamically as the sensor is operated. To take one specific example, the ID range may be 1010X, where each digit is an integer and X (the last digit) is 0-5 for low end car, 6-9 for high end car.

The sensor 104 knows that it is either high end or low end (e.g., by having parameters programmed into it). An LF command is received by the sensor 104 and decoded. It is determined if the LF command is known to be produced by a high end or a low end vehicle. A high end vehicle may be a vehicle that is expensive and/or has many features, accessories, upgrades, and so forth. A low end vehicle may be inexpensive and not have many features, accessories, or upgrades. Then, the ID 111 is set appropriately. Next, the sensor 104 transmits data with the ID. The receiver 110 can determine whether the correct ID is being used. If the receiver 110 determines that the ID is incorrect, the receiver 110 in the vehicle 106 will not send out data. On the other hand, the ID 111 may be locked if appropriate criteria is met.

In other aspects, a configuration (e.g., settings, operational parameters, transmission protocols, transmission formats, transmission frequencies, to mention a few examples) of the sensor 104 is changed based upon a received LF signal. Based upon the language a command is received in, the TPM sensor 104 is configured according to that command language (not what is in the command, but the format, baud rate, and so forth).

In one specific example, an LF command in a Manufacturer A language/protocol is received by sensor 104. The sensor 104 receives and decodes the command, understands the command is in the Manufacturer A language/protocol. The sensor 104 is operated so as to transmit according to only the Manufacturer A language/protocol and/or receive according to the Manufacturer A language/protocol.

The specific vehicle types in some aspects are determined by the actions of the TPM system relearn tool 102 or actions of the vehicle 106 (or components of the vehicle 106). In some other aspects, the TPM sensor 104 remains locked on the configuration, so that it is not inadvertently changed to a different configuration by a TPM System relearn tool or a vehicle action.

In other examples, a selectable reset command of the TPM relearn tool 102 that only resets a targeted TPM sensor is utilized. For instance, the tool 102 sends a re-learn command to sensor 104. The sensor 104 responds by transmitting the ID 111 to the tool 102. The tool 102 receives the ID 111 from sensor (and the ID 111 is specific and unique to sensor). An LF command is sent to the specific sensor 104 only to reset the sensor 104. The sensor 104 is reset to a default configuration.

In other aspects, automatic locking within time limits is performed. In one example, a technician obtains the sensor 104 (e.g., from a box). The technician tests the sensor 104 by triggering it with the tool 102. The technician installs the sensor 104 into a tire 107. At this point, the ID 111 of the sensor 104 is stored in the tool 102 (since the tool 102 reads the ID during testing). The ID 111 is sent/written to the receiver 110 in the vehicle 106. The sensor 104 does not lock into the particular protocol (since it was not triggered while pressurized). When some predetermined event happens, the sensor 104 locks into the last known state it was triggered at (e.g., a state related or associated with a particular vehicle manufacturer where transmissions are made per the protocol of the vehicle manufacturer). This provides an automatic locking for the ID 111. However and in one aspect, the locking occurs within time limits. For instance, locking will automatically occur if not beyond a predetermined time limit.

Figure 2:
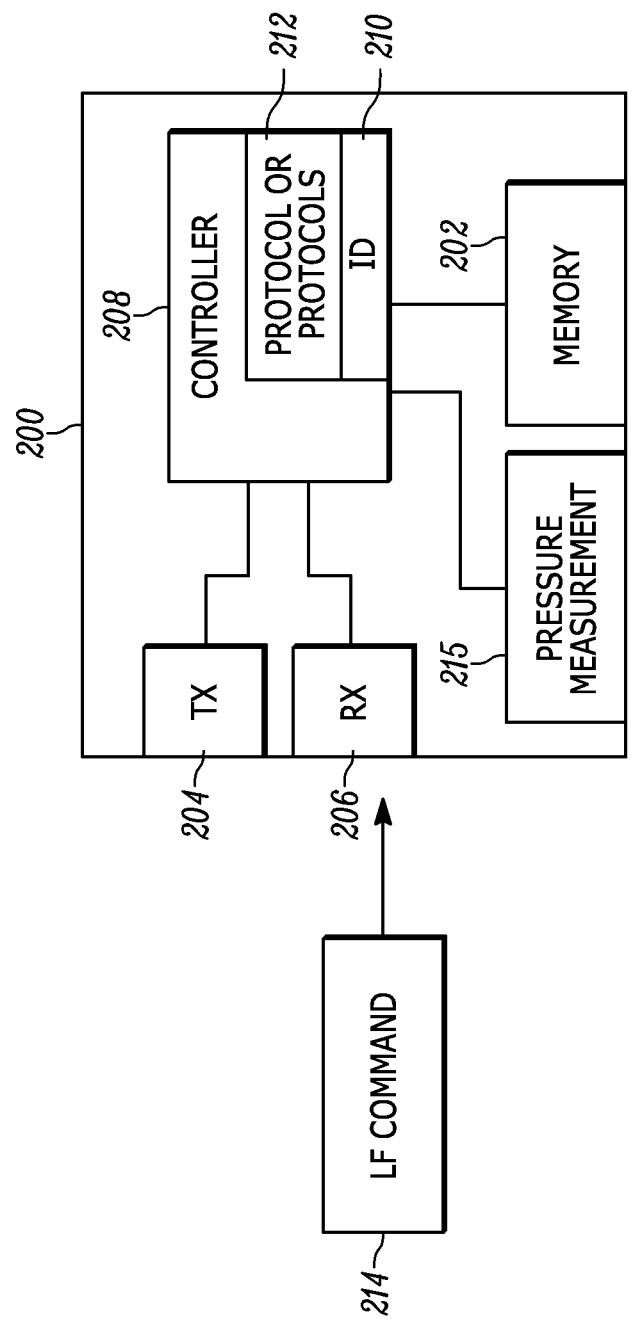
FIG. 2 comprises a block diagram of a TPM sensor according to various embodiments of the present invention.

Referring now to FIG. 2, one example of a TPM sensor 200 is described. The sensor 200 includes a memory 202, a transmitter 204, a receiver 206, and a controller 208. The memory 202 stores a TPM identifier 210 and a current transmission protocol or protocols 212. The receiver 206 is configured to receive a low frequency (LF) signal or command 214, and the LF signal 214 has been transmitted according to a predetermined transmission protocol or language. A pressure measurement device 215 measures the pressure of a tire and communicates this measured pressure to the controller 208. The measured pressure may be transmitted by the transmitter 204. The pressure measurement device 215 may measure other parameters such as temperature as well.

The controller 208 is coupled to the transmitter 204 and the receiver 206. The controller 208 is configured to determine an identity of the predetermined protocol or language, and based upon the determined identity of the predetermined protocol or language, adjust one of the TPM identifier 210 or the current transmission protocol or protocols 212. The TPM sensor 200 subsequently makes transmissions via the transmitter 206 according to the predetermined transmission protocol of the LF signal 214.

Figure 3:
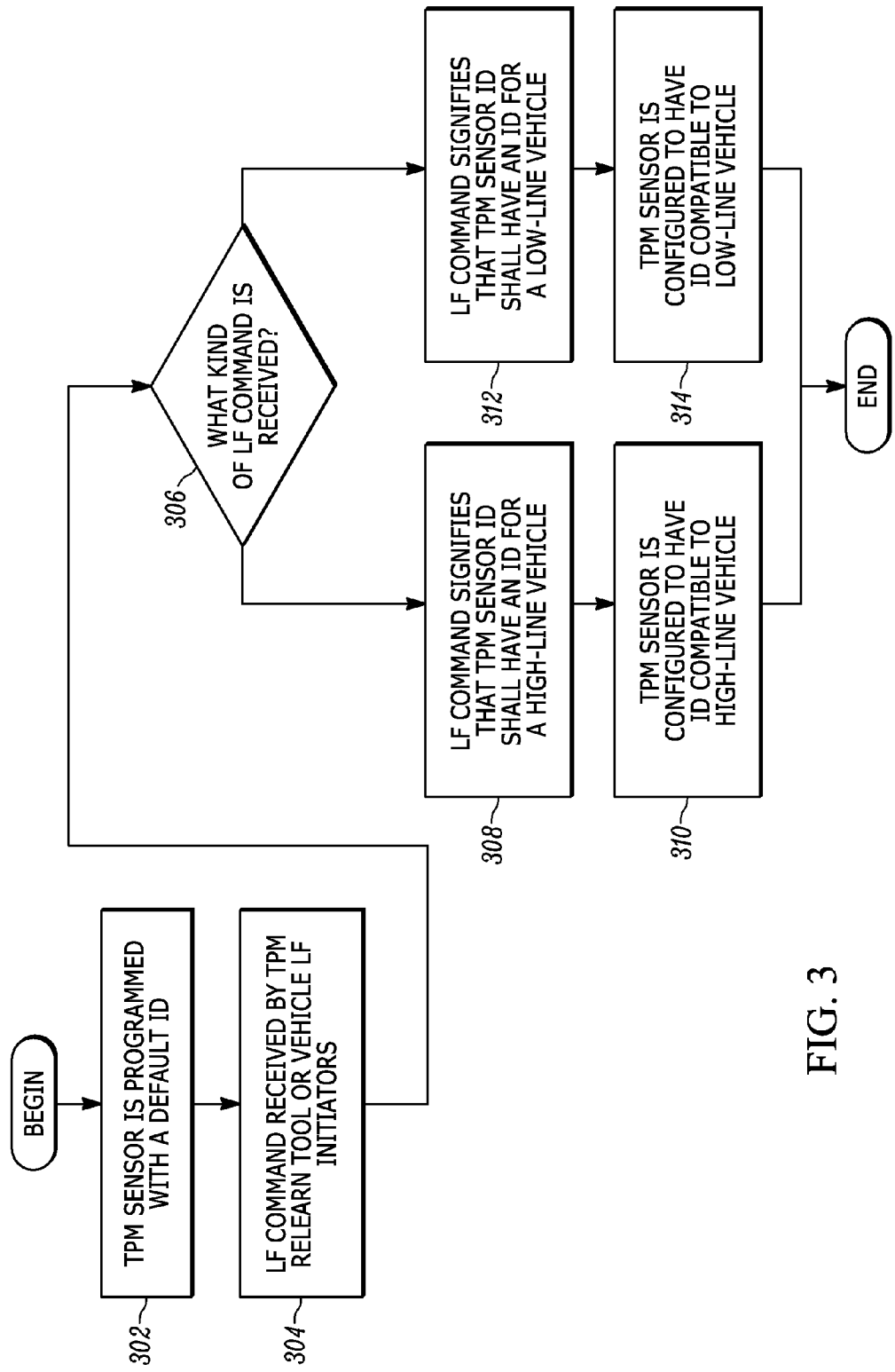
FIG. 3 comprises a flowchart of an approach for setting sensor ID according to various embodiments of the present invention.

Referring now to FIG. 3, one approach for setting TPM sensor ID is described. At step 302, the TPM sensor is programmed with a default ID. At step 304, an LF command is received from a TPM relearn tool or vehicle LF initiator device.

At step 306, it is determined what kind of LF command was received. At step 308, the LF command signifies that the TPM sensor ID will have an ID for a high-line vehicle. At step 310, the TPM sensor is configured to have an ID compatible with a high-line vehicle.

At step 312, the LF command signifies that the TPM sensor ID will have an ID for a low-line vehicle. At step 314, the TPM sensor is configured to have an ID compatible with a low-line vehicle.

Figure 4:
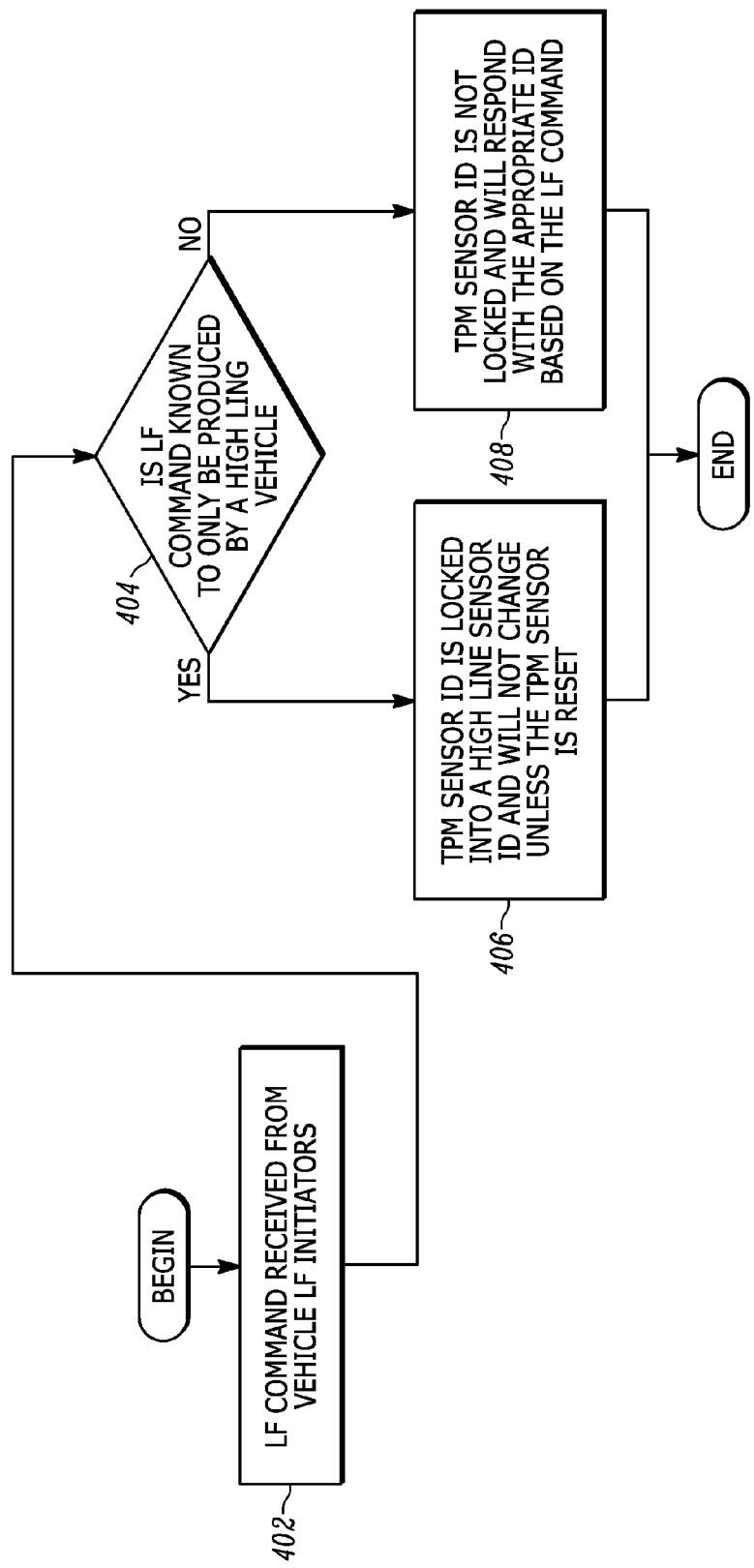
FIG. 4 a flowchart of an approach for setting sensor ID according to various embodiments of the present invention.

Referring now to FIG. 4, one approach for setting or locking TPM sensor ID is described. At step 402, an LF command is received from vehicle LF initiators. At step 404, it is determined if the LF command is known to only be produced by a high line vehicle.

If the answer is affirmative, at step 406 the TPM sensor ID is locked into a high line sensor ID and will not be changed unless the TPM sensor is reset. If the answer is negative, at step 408 the TPM sensor ID is not locked and will respond with an appropriate ID based upon the LF command. It will be appreciated that this is one approach for locking the ID according to the occurrence of certain events and that other examples are possible.

Figure 5:
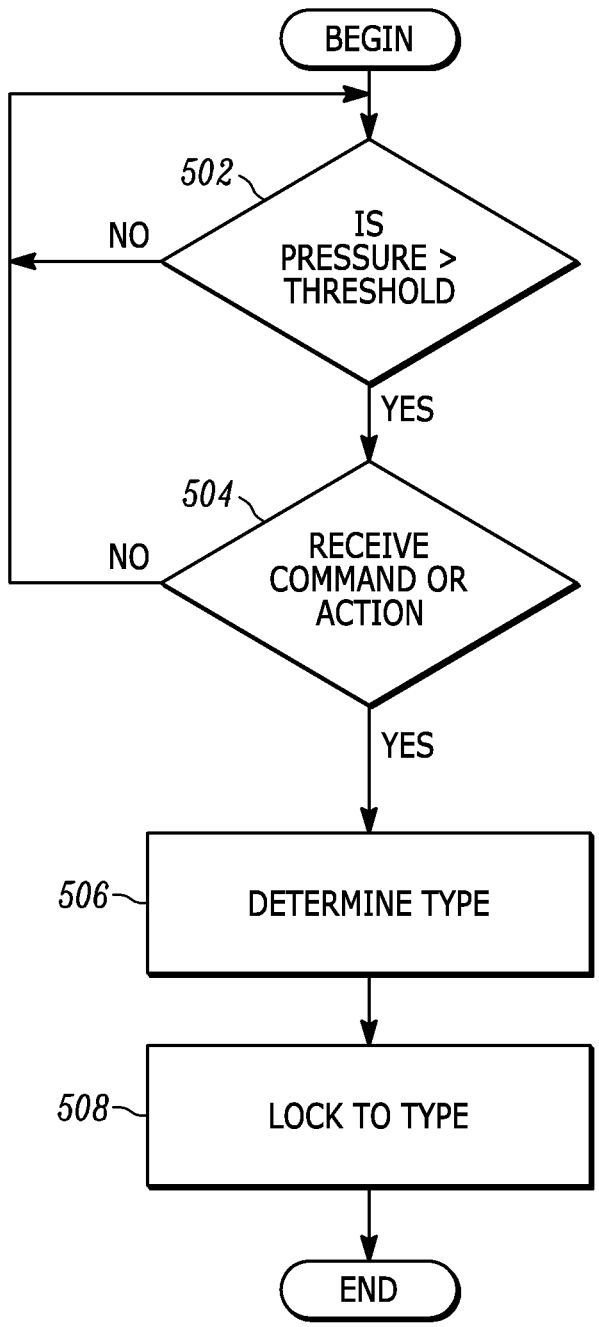
FIG. 5 a flowchart for changing the configuration of a TPM sensor according to various embodiments of the present invention.

Referring now to FIG. 5, one approach for setting TPM sensor configuration is described. At step 502, it is determined with the tire pressure is greater than a predetermined threshold. If the answer is negative, execution returns to step 502. At step 504, it is determined whether an LF command or an indication of a vehicle action has been received. If the answer is negative, execution returns to step 503.

If the answer at step 504 is affirmative, then at step 506, the vehicle type is determined. In one aspect, this is accomplished by determining the language, format, protocol by which the command is transmitted rather than examining the contents of the command. At step 508, the sensor is locked to the type determined for the received LF command. In one example of "locking," transmissions are made according to the determined language, format, or protocol. In some aspects, once locked the ID cannot be changed.

Figure 6:
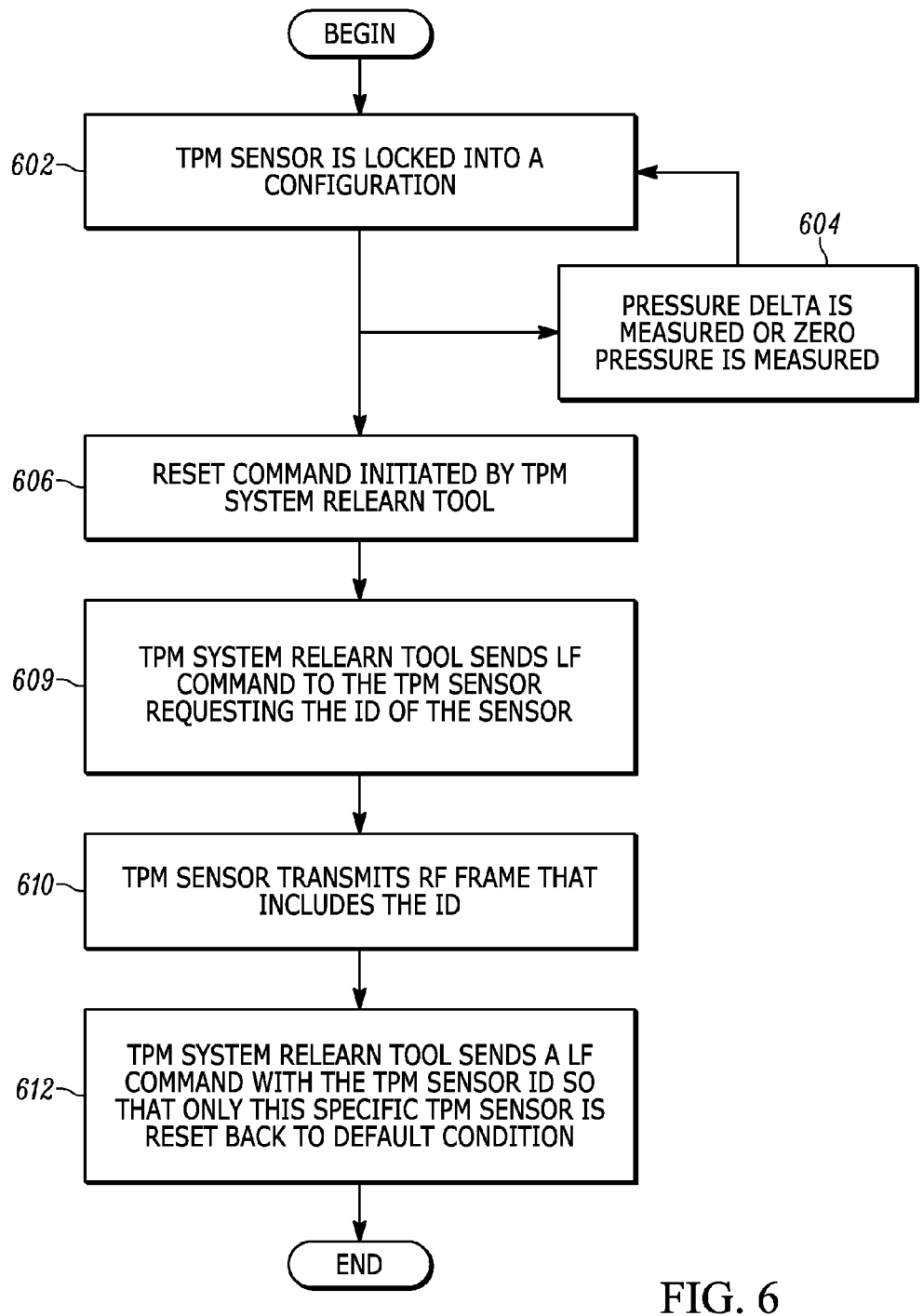
FIG. 6 a flowchart of a relearn approach according to various embodiments of the present invention.

Referring now to FIG. 6, one approach for relearning is described. At step 602, a TPM sensor is locked into a particular configuration. At step 604, the pressure delta is measured or zero pressure is measured. By "pressure delta," it is meant a change in measured pressure from last measurement (or RF transmission) to the current measurement.

At step 606, a reset command is initiated or created at the TPM system relearn tool. At step 608, the TPM system relearn tool sends an LF command to the TPM sensor requesting the ID of the sensor.

At step 610, the TPM sensor transmits an RF frame that includes the ID. At step 612, the TPM system relearn tool sends a LF command with the TPM sensor ID so that only this specific TPM sensor is reset to its default condition. After receiving this command, the TPM sensor resets to its default condition or configuration. In one example, configuration may include the protocol or protocols it transmits or receives. This may include format, baud rate, or transmission frequency to mention a few configuration parameters.

Figure 7:
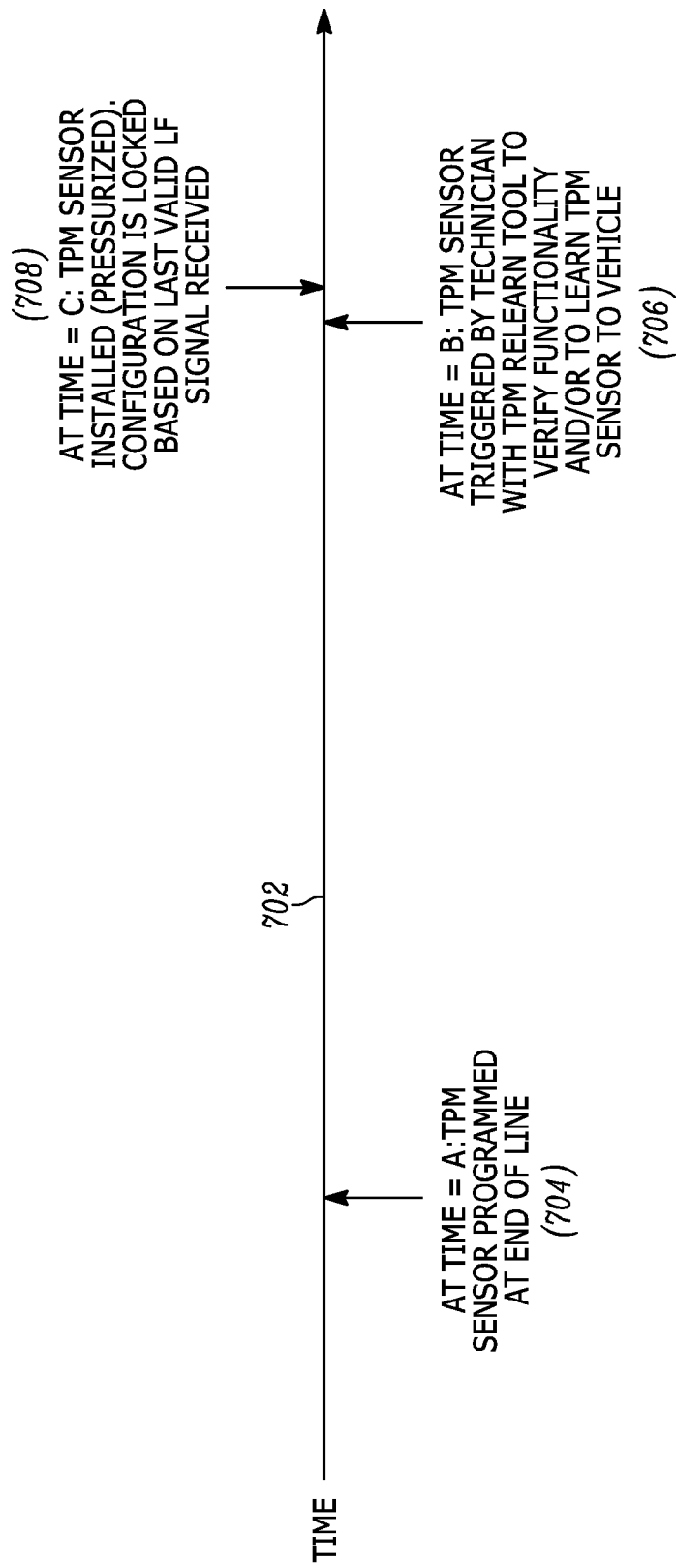
FIG. 7 a time line showing an approach of changing and locking configuration information according to various embodiments of the present invention.

Referring now to FIG. 7, one approach for locking configuration is described. A timeline 702 shows a series of events.

At time 704 (time A), a TPM sensor is programmed at the end of the line. At time 706 (time B), the TPM sensor is triggered by a technician with a TPM relearn tool to verify the functionality and/or learn the TPM sensor to the vehicle. At step 708 (time C), the TPM sensor is installed. The configuration of the TPM sensor may be locked upon the detection of an event (e.g., tire pressurization). In one aspect, this locking occurs only when the value of time B and time C is below a predetermined threshold.

It should be understood that any of the devices described herein (e.g., the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of programming a tire pressure monitoring (TPM) sensor, the TPM sensor being configured with a TPM identifier and making transmissions according to a current transmission protocol or protocols, the method comprising:
   receiving a low frequency (LF) signal, the LF signal having been transmitted according to a predetermined transmission protocol or language;
   determining an identity of the predetermined transmission protocol or language associated with the LF signal;
   based upon the identity of the predetermined transmission protocol or language, adjusting at least one of the TPM identifier or the current transmission protocol or protocols, the adjusting of the TPM identifier comprising changing the TPM identifier at the TPM sensor to a TPM identifier being recognized by a vehicle receiver as correct for a vehicle type, the TPM sensor subsequently making transmissions according to the predetermined transmission protocol associated with the LF signal.

2. The method of claim 1, wherein the LF signal is received from a portable programming tool or from a fixed LF initiator in a vehicle.

3. The method of claim 1, wherein the predetermined transmission protocol is subsequently locked to the TPM sensor.

4. The method of claim 1, wherein the predetermined transmission protocol or language indicates a vehicle manufacturer or type of vehicle.

5. The method of claim 1, wherein the LF signal comprises a first command from a portable programming tool that obtains the identifier, wherein the sensor responsively transmits the identifier to the portable programming tool, and wherein a second LF signal is transmitted from the portable programming tool to the sensor, the second LF signal being a second command that includes the identifier.

6. The method of claim 1, further comprising measuring the pressure of a tire and making the transmissions according to the transmission protocol regardless of the measured pressure.

7. The method of claim 6, further comprising storing the identifier at a portable programming tool, transmitting the identifier from the portable programming tool to a receiver in a vehicle, automatically locking the predetermined transmission protocol to the sensor when a predetermined event is detected.

8. The method of claim 7, wherein the predetermined event is a pressurization of the tire.

9. The method of claim 8, wherein the locking occurs before a predetermined time limit has been reached.

10. A tire pressure monitoring (TPM) sensor, comprising:
- a memory that stores a TPM identifier and a current transmission protocol or protocols;
- a transmitter;
- a receiver that is configured to receive a low frequency (LF) signal, the LF signal having been transmitted according to a predetermined transmission protocol or language;
- a controller coupled to the transmitter and the receiver, the controller configured to determine an identity of the predetermined protocol or language, and based upon the determined identity of the predetermined protocol or language, adjust at least one of the TPM identifier or the current transmission protocol or protocols, the adjusting of the TPM identifier comprising changing the TPM identifier at the TPM sensor to a TPM identifier being recognized by a vehicle receiver as correct for a vehicle type, the TPM sensor subsequently making transmissions according to the predetermined transmission protocol of the LF signal.

11. The TPM sensor of claim 10, wherein the LF signal is received from a portable programming tool or from a fixed LF initiator in a vehicle.

12. The TPM sensor of claim 10, wherein the predetermined transmission protocol is subsequently locked to the TPM sensor.

13. The TPM sensor of claim 10, wherein the predetermined transmission protocol or language indicates a vehicle manufacturer or type of vehicle.

14. The TPM sensor of claim 10, wherein the LF signal comprises a first command from a portable programming tool that obtains the TPM identifier, and wherein the sensor responsively transmits the identifier to the portable programming tool, and wherein a second LF signal is transmitted from the portable programming tool to the sensor and received by the sensor, the second LF signal being a second command that includes the identifier.

15. The TPM sensor of claim 10, further comprising a measurement device that is configured to measure the pressure of a tire and wherein the sensor makes the transmissions according to the predetermined transmission protocol regardless of the measured pressure.

16. The TPM sensor of claim 15, the identifier is stored at a portable programming tool, and transmitted from the portable programming tool to a receiver in a vehicle, and wherein the predetermined transmission protocol is locked to the sensor when a predetermined event is detected by the sensor.

17. The TPM sensor of claim 15, wherein the predetermined event is a pressurization of the tire.

18. The TPM sensor of claim 17, wherein the locking occurs before a predetermined time limit has been reached.

19. A non-transitory computer usable medium having a computer readable program code embodied therein, the computer readable program code adapted to be executed to implement a method of programming a tire pressure monitoring (TPM) sensor, the TPM sensor being configured with a TPM identifier and making transmissions according to a current transmission protocol or protocols, the method comprising:
- receiving a low frequency (LF) signal, the LF signal having been transmitted according to a predetermined transmission protocol or language;
- determining an identity of the predetermined transmission protocol or language associated with the LF signal;
- based upon the identity of the predetermined transmission protocol or language, adjusting at least one of the TPM identifier or the current transmission protocol or protocols, the adjusting of the TPM identifier comprising changing the TPM identifier at the TPM sensor to a TPM identifier being recognized by a vehicle receiver as correct for a vehicle type, the TPM sensor subsequently making transmissions according to the predetermined transmission protocol associated with the LF signal.

20. The non-transitory computer usable medium of claim 19, wherein the LF signal is received from a portable programming tool or from a fixed LF initiator in a vehicle.

21. The non-transitory computer usable medium of claim 19, wherein the predetermined transmission protocol is subsequently locked to the TPM sensor.

22. The non-transitory computer usable medium of claim 19, wherein the predetermined transmission protocol or language indicates a vehicle manufacturer or type of vehicle.

23. The non-transitory computer usable medium of claim 19, wherein the LF signal comprises a first command from a portable programming tool that obtains the identifier, wherein the sensor responsively transmits the identifier to the portable programming tool, and wherein a second LF signal is transmitted from the portable programming tool to the sensor, the second LF signal being a second command that includes the identifier.

24. The non-transitory computer usable medium of claim 19, further comprising measuring the pressure of a tire and making the transmissions according to the transmission protocol regardless of the measured pressure.

25. The non-transitory computer usable medium of claim 24, further comprising storing the identifier at a portable programming tool, transmitting the identifier from the portable programming tool to a receiver in a vehicle, automatically locking the predetermined transmission protocol to the sensor when a predetermined event is detected.

26. The non-transitory computer usable medium of claim 25, wherein the predetermined event is a pressurization of the tire.

27. The non-transitory computer usable medium of claim 26, wherein the locking occurs before a predetermined time limit has been reached.

* * * * *